(12) United States Patent
Demarse

(10) Patent No.: US 9,596,811 B2
(45) Date of Patent: Mar. 21, 2017

(54) DEVICE AND METHOD FOR HYDRATING FLOWERS

(71) Applicant: ECO FRESH BOUQUET, INC., Brooklyn, NY (US)

(72) Inventor: Deborah Sue Demarse, Brooklyn, NY (US)

(73) Assignee: Eco Fresh Bouquet, Inc., Brooklyn, NY (US)

(*) Notice: Subject to any disclaimer, the term of this patent is extended or adjusted under 35 U.S.C. 154(b) by 0 days.

(21) Appl. No.: 14/714,849

(22) Filed: May 18, 2015

(65) Prior Publication Data

US 2016/0192596 A1    Jul. 7, 2016

Related U.S. Application Data

(60) Provisional application No. 62/100,461, filed on Jan. 6, 2015.

(51) Int. Cl.
| | | |
|---|---|---|
| *A01G 5/06* | (2006.01) | |
| *B65D 85/50* | (2006.01) | |
| *B65B 11/00* | (2006.01) | |
| *B65B 51/04* | (2006.01) | |

(52) U.S. Cl.
CPC .............. *A01G 5/06* (2013.01); *B65B 11/004* (2013.01); *B65B 51/04* (2013.01); *B65D 85/505* (2013.01)

(58) Field of Classification Search
CPC ...... A01G 5/06; A01G 9/1086; B65D 85/505; A47G 7/06; A47G 7/00; B65B 11/004; B65B 51/04

USPC .... 206/423; 47/41.01, 65.7, 65.8, 72, 41.13, 47/41.15, 64
See application file for complete search history.

(56) References Cited

U.S. PATENT DOCUMENTS

| | | | |
|---|---|---|---|
| 1,044,260 A | | 11/1912 | Schloss |
| 2,247,191 A | | 6/1941 | Endres |
| 3,271,922 A | | 9/1966 | Wallerstein et al. |
| 3,657,840 A | | 4/1972 | Benoist |
| 3,767,104 A | | 10/1973 | Bachman et al. |
| 4,784,864 A | * | 11/1988 | Ikeda ................. B65D 75/5816 229/87.05 |
| 4,946,290 A | * | 8/1990 | Matyja .................. B65D 31/16 206/423 |
| 4,972,627 A | * | 11/1990 | Hori ..................... A01G 9/1086 206/423 |
| 5,695,058 A | * | 12/1997 | Dellecker ................ A01G 5/06 206/423 |
| 6,665,982 B1 | | 12/2003 | Van Wingerden |
| D583,256 S | * | 12/2008 | Rothstein ....................... D9/709 |
| 7,921,597 B2 | | 4/2011 | Castleberry |
| 8,522,475 B2 | | 9/2013 | Castleberry |

(Continued)

OTHER PUBLICATIONS

International Search Report for PCT/US16/12067 filed Jan. 4, 2016.
Written Opinion for PCT/US16/12067 filed Jan. 4, 2016.

*Primary Examiner* — Steven A. Reynolds
(74) *Attorney, Agent, or Firm* — Gottlieb, Rackman & Reisman, PC

(57) ABSTRACT

A device and a method for hydrating each stem of a bunch of fresh cut flowers during transport. The device includes a liquid retaining flexible wrap substantially forming a right isosceles pentagon that is adaptable to directly contact the distal ends of each one of a plurality of stems of a bunch of flowers.

17 Claims, 7 Drawing Sheets

(56) References Cited

U.S. PATENT DOCUMENTS

| | | | |
|---|---|---|---|
| 2003/0051403 A1* | 3/2003 | Weder | A01G 5/00 47/72 |
| 2004/0134125 A1 | 7/2004 | Weder | |
| 2006/0032118 A1* | 2/2006 | Castleberry | A01G 9/1086 47/41.01 |
| 2009/0211153 A1* | 8/2009 | Harshman | B65D 85/505 47/66.7 |
| 2011/0099896 A1 | 5/2011 | Weder | |
| 2012/0023817 A1 | 2/2012 | Charrin | |

* cited by examiner

US 9,596,811 B2

DEVICE AND METHOD FOR HYDRATING FLOWERS

CROSS-REFERENCE TO RELATED APPLICATION

This patent application claims benefit under 35 U.S.C. §119 to U.S. Provisional Patent Application No. 62/100,461, filed Jan. 6, 2015, which is hereby incorporated by reference in its entirety as part of the present disclosure.

FIELD OF THE INVENTION

The present invention relates generally to floriculture and more particularly to a device and method for hydrating stems of cut flowers.

BACKGROUND OF THE INVENTION

The floriculture industry has grown expo from its inception in the nineteenth century to a multibillion dollar industry today. After flowers are harvested, among other procedures, flowers are regularly packaged and transported to wholesalers and/or vendors.

Commonly, fresh cut flowers are shipped from harvest to wholesalers and/or vendors in containers where the flowers are bunched together and arranged in a plurality of layers with the stems of one bunch of flowers opposing the stems of another bunch of flowers. Additionally or alternatively, devices may be used to transport flowers that can include a plastic sleeve in which a bunch of flowers or each flower is arranged in between layers of filler, such as newspaper or shredded paper, a conical paper container that has a plurality of spaced tear-shaped openings for holding flower stems, a continuous strip that is rolled so that that flowers are isolated from one another, flexible paper coverings to protect flower petals, cardboard sleeves for receiving stems and waterproof wrappers covering the stems of flowers. However, these devices, while useful to protect the flowers, do not provide a means of efficient water delivery to hydrate and prolong the life of the flowers.

As a result of transporting flowers without water, flowers regularly arrive at wholesalers and/or retailers in a dehydrated state. To hydrate and prolong the life of flowers, the stems are regularly trimmed and the flowers are placed in water in a refrigeration unit, away from direct sunlight, soon after they arrive at retail location.

To transport the flowers, the stems of the flowers may be placed in individual vials filled with water, the stems can be placed in a vase with water, the stems can be arranged in a plastic bag containing water that is secured to the stems or in some instances an arrangement of flowers is simply transported without an form of hydration.

However, no simple, easy-to-use, non-damaging and inexpensive device or method exists to cover each stem to ensure that each fresh cut flower is hydrated during wholesale shipment and/or delivery from a retail location to a customer. Additionally, no device or method exists to hydrate the stems of hand-held bouquets of fresh cut flowers while at the same time ensuring that water does not drip or spill from the bouquet and/or that the bouquet does not require to be stored in a vase or bucket of water.

SUMMARY OF THE INVENTION

The present invention is directed to an isosceles right pentagon shaped wrap formed from absorbent material and a method of assembling the same that firmly directly contacts each individual stem of a variety of bunch of flowers to deliver water and/or a liquid solution to the flowers to preserve and prolong the freshness of the fresh cut flowers.

In an embodiment, the present invention is directed to an apparatus that comprises a liquid retaining right isosceles pentagon shaped wrap that is adaptable to at least partially encompass a plurality of stems of a floral arrangement and directly contact each of the stems to prolong the life of the flowers. In an embodiment, the wrap is comprised of a renewable, ecologically sound and raw material that includes a sterile, unique blend of natural components that are highly absorbent, biodegradable and compostable.

In an embodiment, the wrap is defined by a first sidewall that has a first end and a second end, a second sidewall that has a first end and a second end and that extends perpendicular from the second end of the first sidewall, a third sidewall that has a first end and a second end and extends at a first angle from the second end of the second sidewall, a fourth sidewall that has a first end and a second end and extends at a second angle from the second end of the third sidewall and a fifth sidewall that has a first end and a second end and extends between the fourth sidewall and the first sidewall and extends at an angle from the second end of the fourth sidewall and is perpendicular to the first end of the first sidewall.

The wrap can be divided by imaginary lines into a first portion, a second portion and a third portion. In an embodiment, the first portion can extend from the second end of the second sidewall and the first end of the fifth sidewall toward an apex formed between the second end of the third sidewall and the first end of the fourth sidewall. In an embodiment, the second portion can be a region that extends approximately from a midpoint of the first sidewall toward the second end of the first sidewall and from the midpoint of the first sidewall toward the second end of the second sidewall. In an embodiment, the third portion is a region that extends approximately between the first end of the first sidewall and the midpoint of the first sidewall to the second end of the fifth sidewall and the midpoint of the first sidewall.

In an embodiment, the wrap can be flexible so that the first portion, the second portion and the third portion of the wrap can be folded over the stems of cut flowers, with the first portion directly contacting each stem of the flowers arranged within the wrap and the first, second and third portions forming a compact and streamlined enclosure to hydrate and protect the stems of fresh cut flowers.

In an embodiment, the first angle formed between the second end of the second sidewall and the first end of the third sidewall and the second angle formed between the second end of the fourth sidewall and the first end of the fifth sidewall ensures that the wrap and the stems of flowers are in direct and continuous contact with each other.

In an embodiment, the present invention is directed to method of assembling a floral hydration system that comprises the steps of providing a liquid retaining flexible element that substantially forms a right isosceles pentagon, placing a plurality of stems of flowers on the floral wrap, folding the first portion of the wrap in a first direction toward the stems of the flowers to cover a distal end of the stems and directly contact each of the stems of the flowers placed thereon, folding the second portion of the wrap in a second direction toward the stems of the flowers, at least partially covering the first portion of the floral wrap, folding the third portion of the wrap in a third direction toward the stems of the flowers, which is opposite the second direction, and wrapping the third portion around the stems of the flowers, at least partially covering the first portion and the second portion to encompass the stems of the flowers with the floral wrap and arranging a fastener over the floral wrap to releasably secure the floral wrap to the stems of the flowers.

In an embodiment, the method further comprises the step of securing the stems of the flowers with another fastener prior to placing the stems onto the wrap.

In an embodiment, the method further comprises the step of squeezing excess liquid from the wrap and placing the wrap that is releasably secured to the stems of the flowers into a liquid solution the can be comprised of water and floral preservatives to hydrate the flowers.

In an embodiment, the method further comprises the step of gently squeezing the wrap just enough to ensure the liquid solution does not drip therefrom after the wrap is secured to the flowers. However, upon squeezing of the wrap, the wrap retains water therein, just not an excessive amount of water that could lead to dripping therefrom. In another embodiment, the method further comprises the step of placing the wrap into a liquid solution that can be comprised, for example, of water and floral preservatives to hydrate the flowers prior to placing the plurality of stems of flowers on the wrap. Here, excess water can be removed before the wrap is secured to a plurality of flowers or after the wrap is secured to the flowers.

In an embodiment, the method further comprises the steps of placing the wrap in an open end of a polypropylene bag and releasably securing the bag near the open end of the polymeric bag. In an embodiment, the material covering the stems is held in place with an elastic band.

DETAILED DESCRIPTION OF EMBODIMENTS OF THE INVENTION

Figure 1:
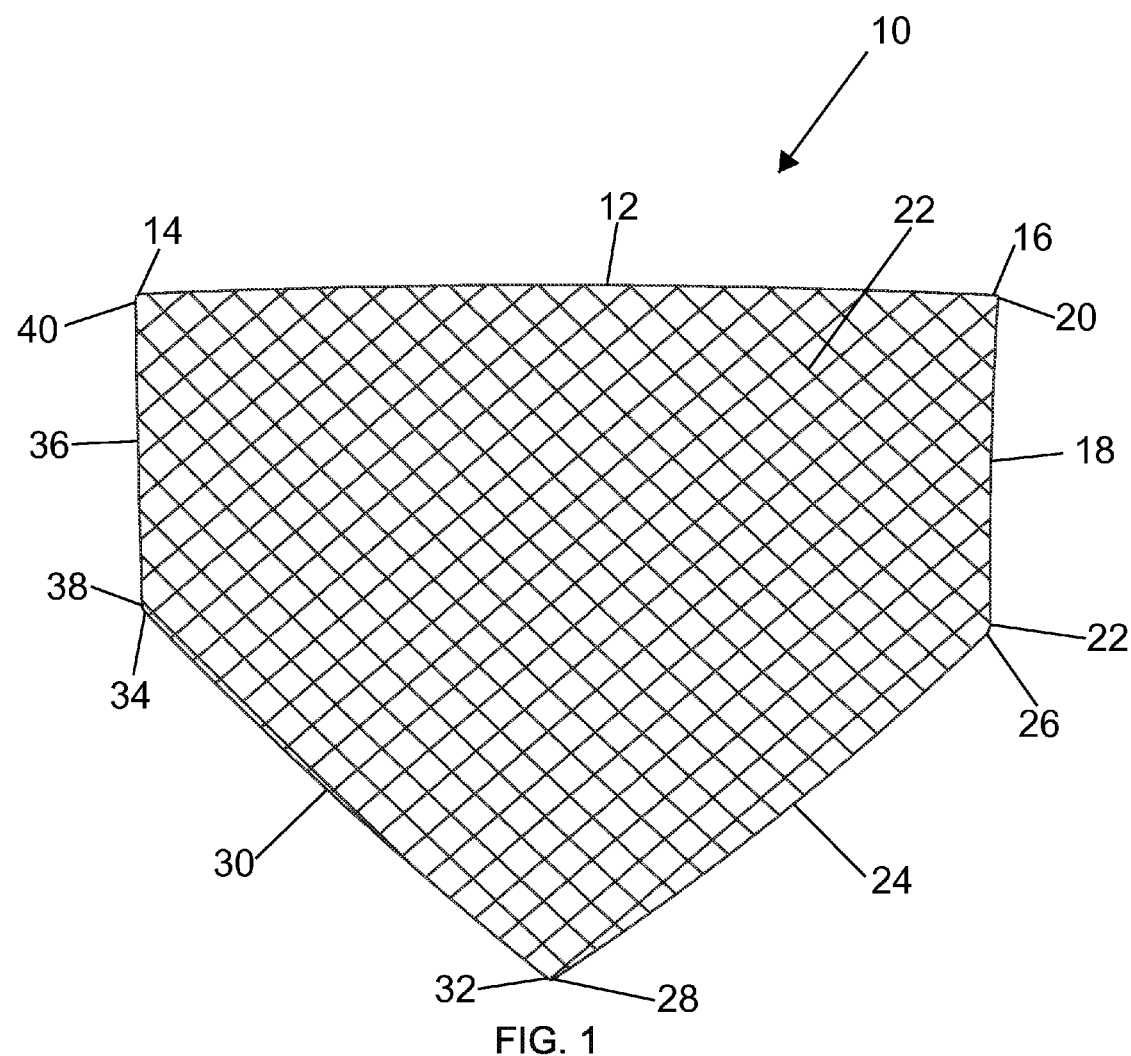
FIG. 1 is a front of an embodiment of a floral Trap of the present invention.

With reference now to the drawings, and in particular to FIGS. 1 through 7, an embodiment of a wrap for use with flowers of the present invention, which is generally designated by the reference numeral 10 will be described.

FIG. 1 illustrates an embodiment of the front view of the wrap 10 that includes a first sidewall 12 that has a first end 14 and a second end 16, a second sidewall 18 that has a first end 20 and a second end 22 and extends perpendicular from the second end 16 of the first sidewall 12, a third sidewall 24 that has a first end 26 and a second end 28 and extends at an angle from the second end 22 of the second sidewall 18, a fourth sidewall 30 that has a first end 32 and a second end 34 and extends at an angle from the second end 28 of the third sidewall 24 and a fifth sidewall 36 that has a first end 38 and a second end 40 and extends between the fourth sidewall and the first sidewall at an angle from the second end 34 of the fourth sidewall 30 and perpendicular to the first end 14 of the first sidewall 12. In combination, the sidewalls 12, 18, 24, 30 and 36 substantially form an isosceles right pentagon shaped element.

In an embodiment, the wrap 10 is divided into three portions between imaginary lines. These portions include a first portion 42, a second portion 44 and a third portion 46. The first portion 42 is substantially a right isosceles triangle that extends from the second end 22 of the second sidewall 18 to the first end 38 of the fifth sidewall 36 and toward an apex 48 formed between the second end 28 of the third sidewall 24 and the first end 32 of the fourth sidewall 30. The second portion 44 is substantially a rectangular region that extends approximately from the midpoint of the first sidewall 12 toward the second end 16 of the first sidewall 12 and from the midpoint of the first sidewall 12 toward the second end 22 of the second sidewall 18. The third portion 46 is substantially a rectangular region that extends approximately between the first end 14 of the first sidewall 12 and the midpoint of the first sidewall 12 to the second end 38 of the fifth sidewall 36 and the midpoint of the first sidewall 12.

In an embodiment, the floral wrap 10 has a width that is between approximately about 6 inches to 13 inches. In an embodiment, the floral wrap 10 has a length that is between approximately about five inches to thirteen inches. In an embodiment, the floral wrap 10 has a hypotenuse is between approximately about two inches to nine inches. In an embodiment, the floral wrap 10 a thickness of the material is between approximately about $1/16$ inch to $1/4$ inch. However, the floral wrap 10 can be of any desired size to accommodate a variety of flowers and a variety of floral arrangements.

In an embodiment, the material of which the wrap 10 is comprised of is an ecologically sound and sterile a unique blend of highly absorbent, biodegradable and compostable natural components.

Figure 2:
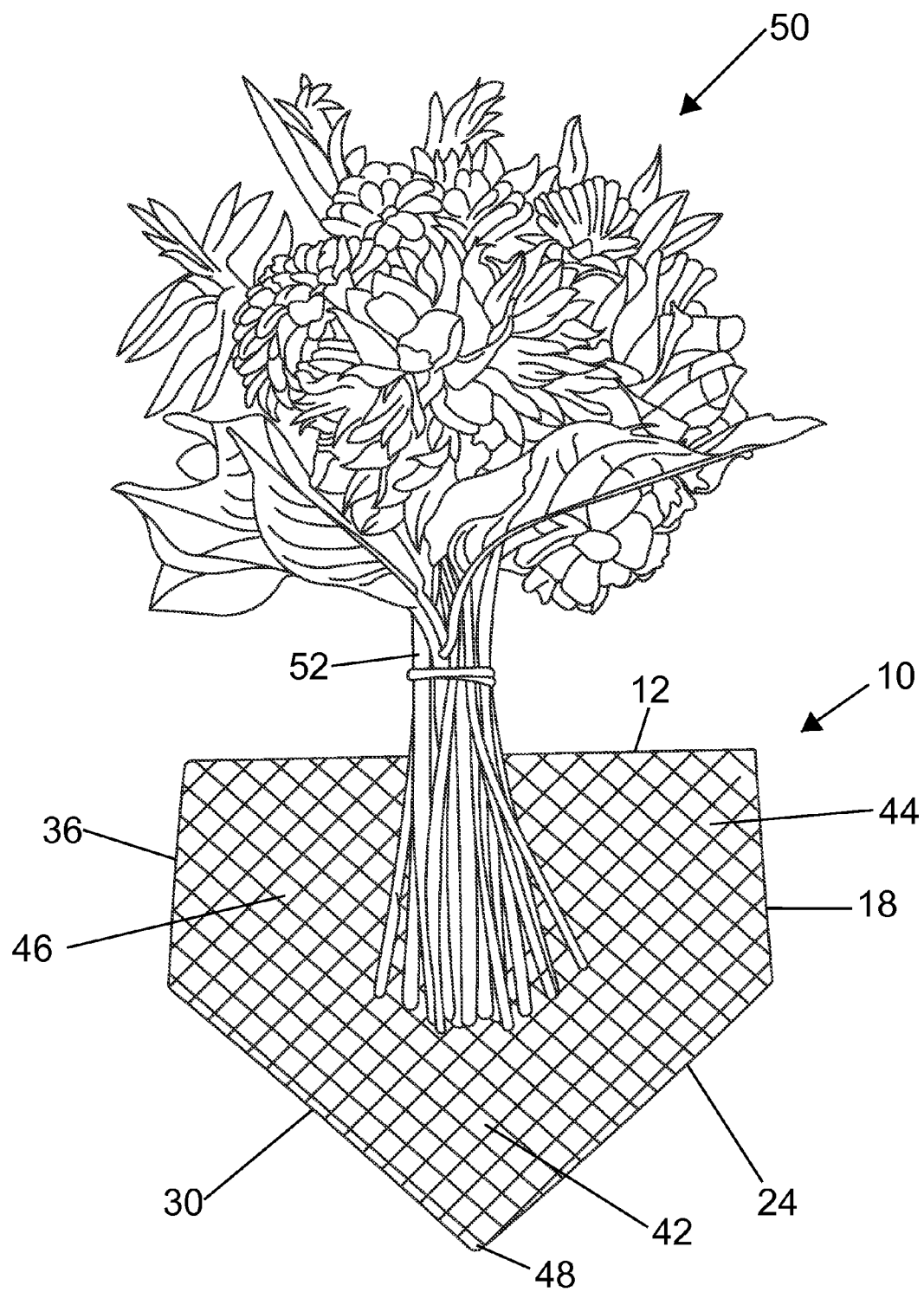
FIG. 2 is a front view of the floral wrap of FIG. 1 with stems of a bouquet of flowers placed on the floral wrap.
Figure 3:
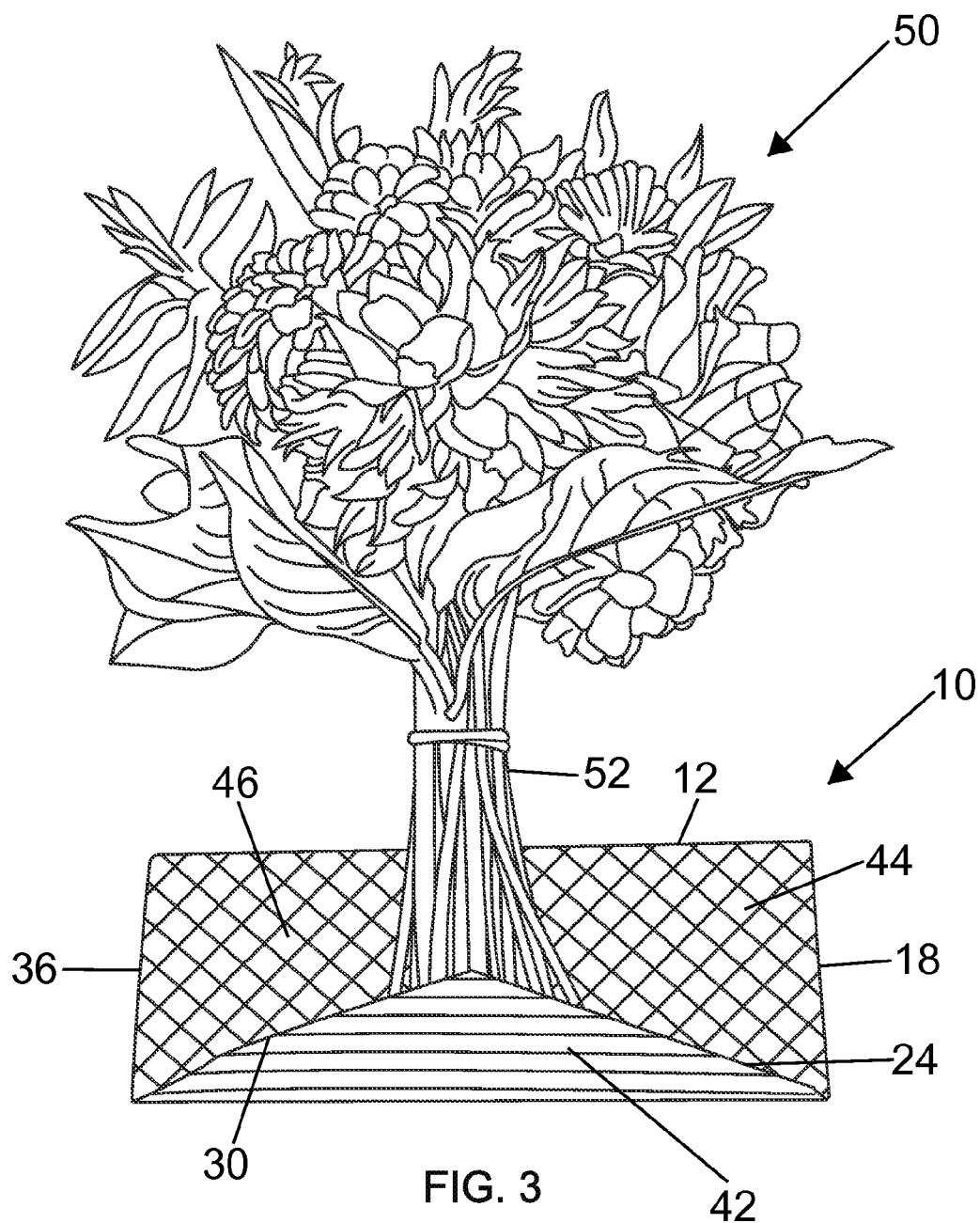
FIG. 3 is a front view of the floral wrap of FIG. 1 with a first side portion of the wrap configured to partially cover stems of flowers.
Figure 4:
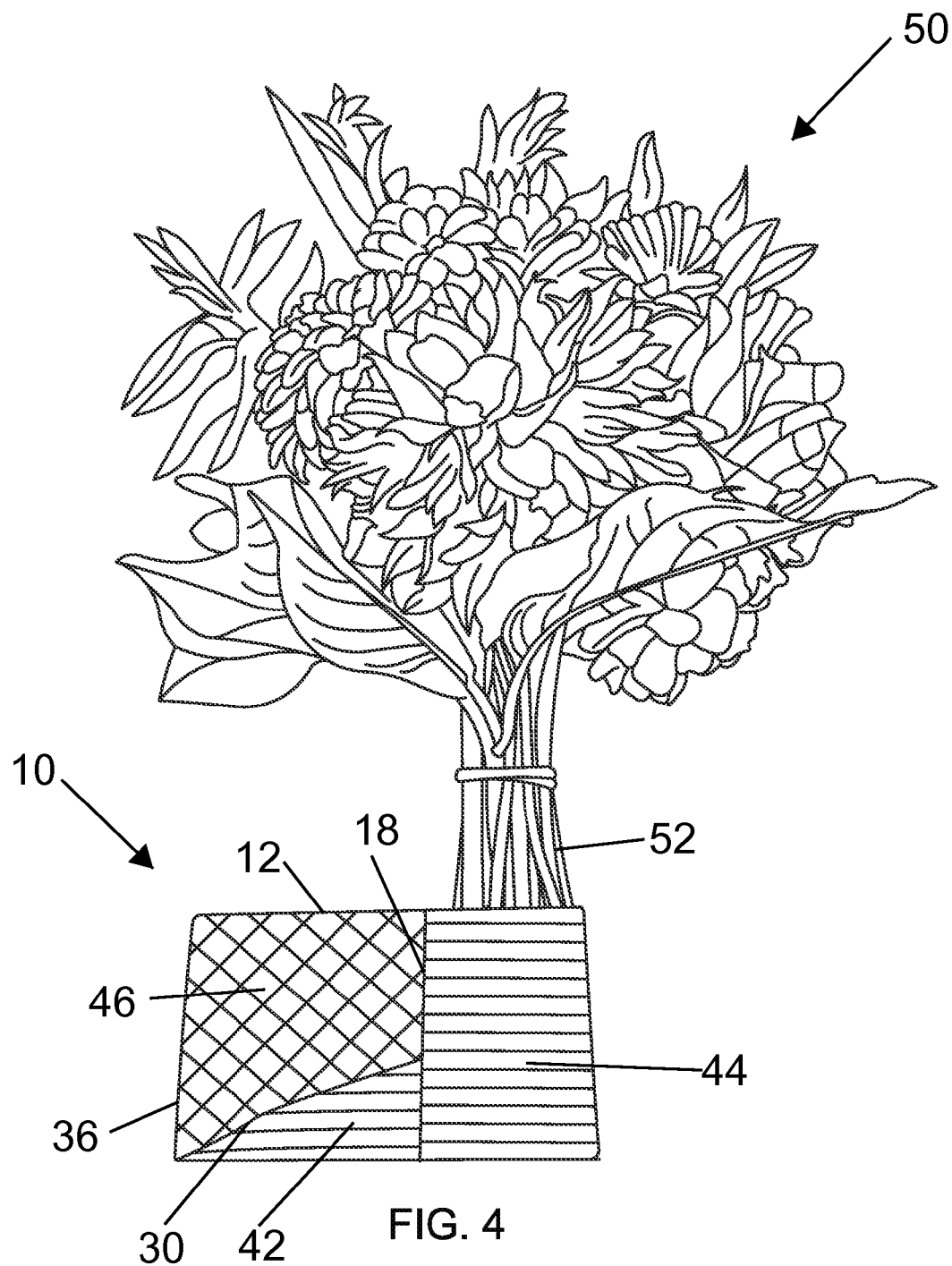
FIG. 4 is a front view of the wrap of FIG. 1 showing the first side portion of the wrap configured to partially cover stems of flowers and a second side portion of the wrap adapted to be folded over the first side portion and further cover the stems of flowers.
Figure 5:
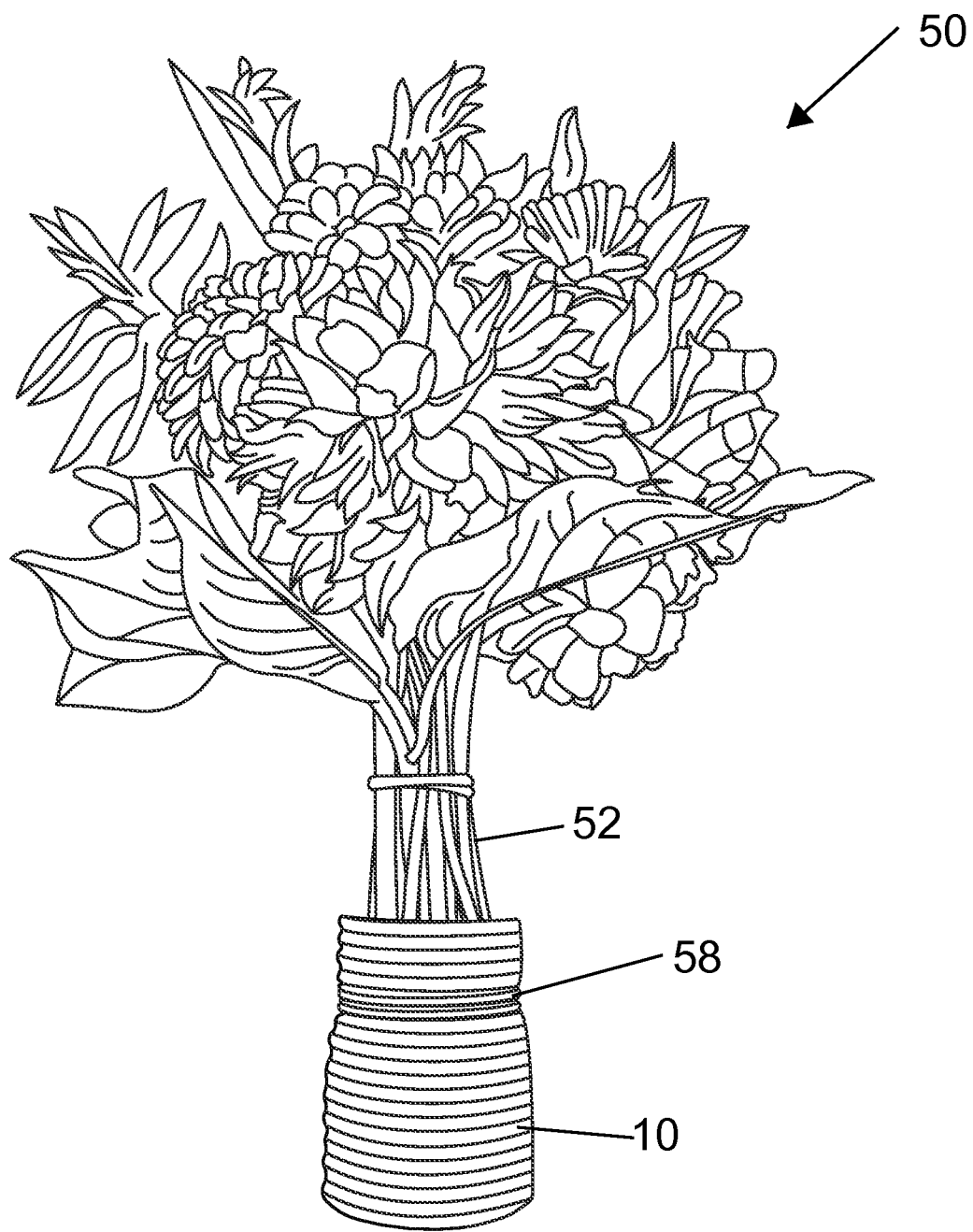
FIG. 5 is a perspective view of the wrap of FIG. 1 showing the first side portion of the wrap configured to partially cover stems of flowers, the second side portion folded over the first side portion and a third side portion folded over the first and second portions with the wrap held in place by a fastener.

FIGS. 2-5 depict an embodiment of a method of securing the wrap 10 to a bunch of flowers 50. As shown in FIG. 2, the bunch of flowers 50 is first placed in the middle of the wrap 10 with the distal end of the stems 52 facing the first portion 42 of the wrap 10 that is substantially V-shaped such that it has an isosceles triangular shape and formed in part by the third sidewall 24 and the fourth sidewall 30. Next, as shown in FIG. 3, the first portion 42 of the wrap 10 is folded toward the first sidewall 12, covering the distal end of each of the stems 52 and ensuring that all of the stems 52 are in direct contact with the wrap 10. By design, the right isosceles triangular shape of the first portion 42 ensures contact between the stems 52 of a bunch of flowers 50 and the wrap 10, eliminating any gaps that may be formed within the wrap 10 during folding of the first portion to ensure the stems 52 are completely enclosed within the wrap 10 and that every stem 52 arranged within the wrap 10 is in direct contact with the wrap 10 to ensure hydration to each stem 52. FIG. 4 shows the second portion 44 of the wrap 10 being folded partially around the stems 52, toward the fifth sidewall 36. FIG. 5 shows the third side portion 46 of the wrap 10 wrapped toward and over the first side portion 42. In combination, the first portion 42, the second portion 44 and the third portion 46 ensure direct contact between the wrap 10 and the stems 52 and the first portion 42, the second portion 44 and the third portion 46 also form a snug, streamline seal around the stems 52 to ensure that the stems 52 of the flowers 50 are maintained and secured within the wrap 10. A releasable fastener 58 can then be placed over the wrap 10 to ensure the wrap 10 is retained on the stems 52 of the bunch of flowers 50. The wrap 10 essentially forms a swaddle around the stems 52 to continually hydrate the stems 52 of the bunch of flowers 50.

In an embodiment, after the wrap 10 is secured to the bunch of flowers 50, the wrap 10 is then placed in a liquid that can be water or a water/floral solution 60. Excess water is removed from the wrap 10 by gently squeezing the wrap 10 to ensure no drippage from the wrap 10. However, upon squeezing of the wrap 10, the wrap 10 still retains water therein, just not an excessive amount of water that could lead to dripping therefrom. In another embodiment, the wrap 10 is placed in a liquid that can be water or a water/floral solution prior to being secured to a floral arrangement 50. Here, excess water can be removed before the wrap 10 is secured to a plurality of flowers 50 or after the wrap 10 is secured to the flowers 50. By wetting the wrap 10 prior to the wrap 10 contacting stems 52 of flowers 50, the wrap 10 can hydrate the flowers 50 for an even longer period of time. The wrap 10 is designed for long-retention of water depending on the number and size of stems arranged in the wrap 10.

Figure 6:
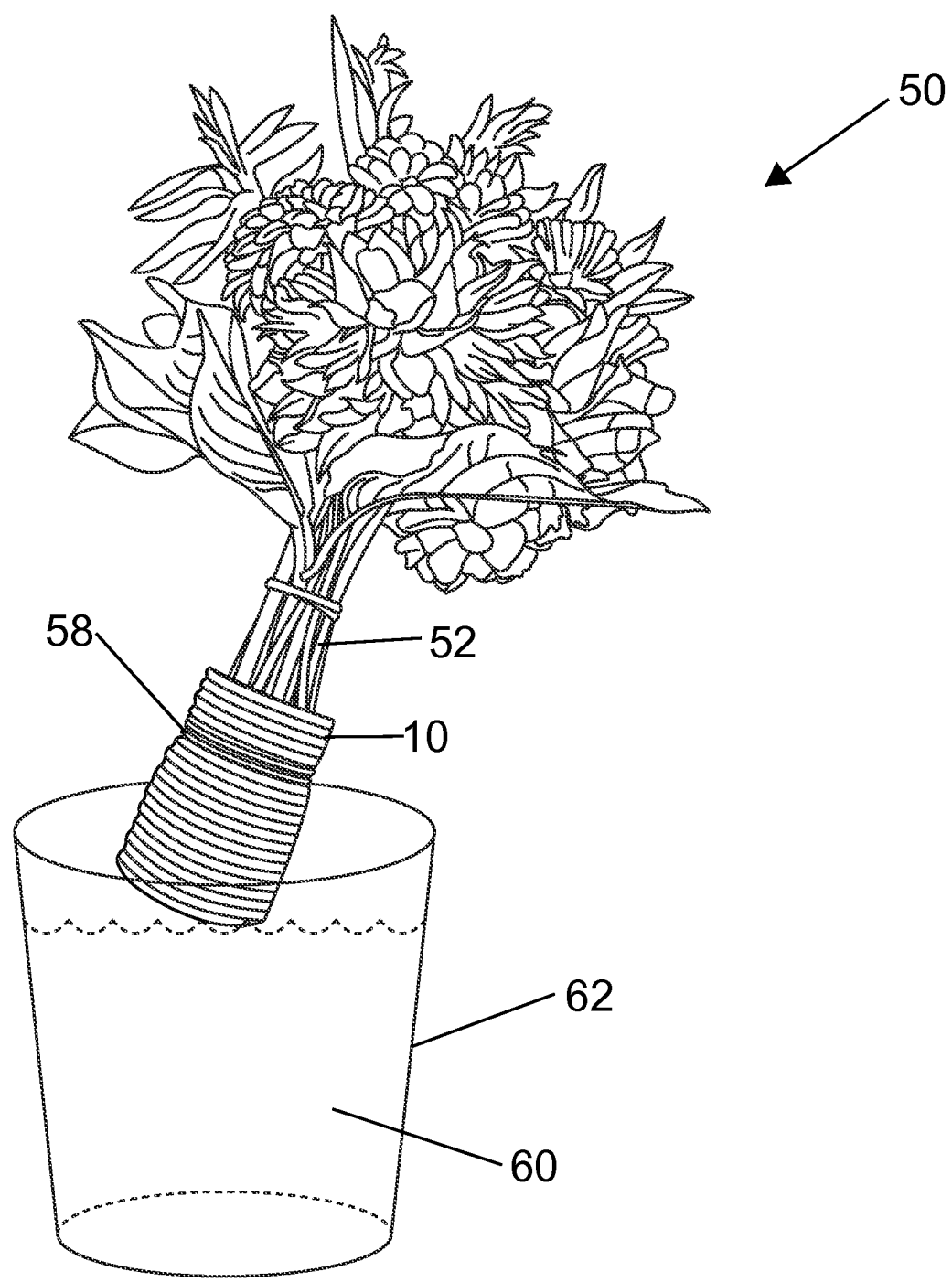
FIG. 6 is a perspective view of the bouquet of flowers with the stems substantially encompassed by the floral wrap of FIG. 1 and placed in water or a liquid solution.
Figure 7:
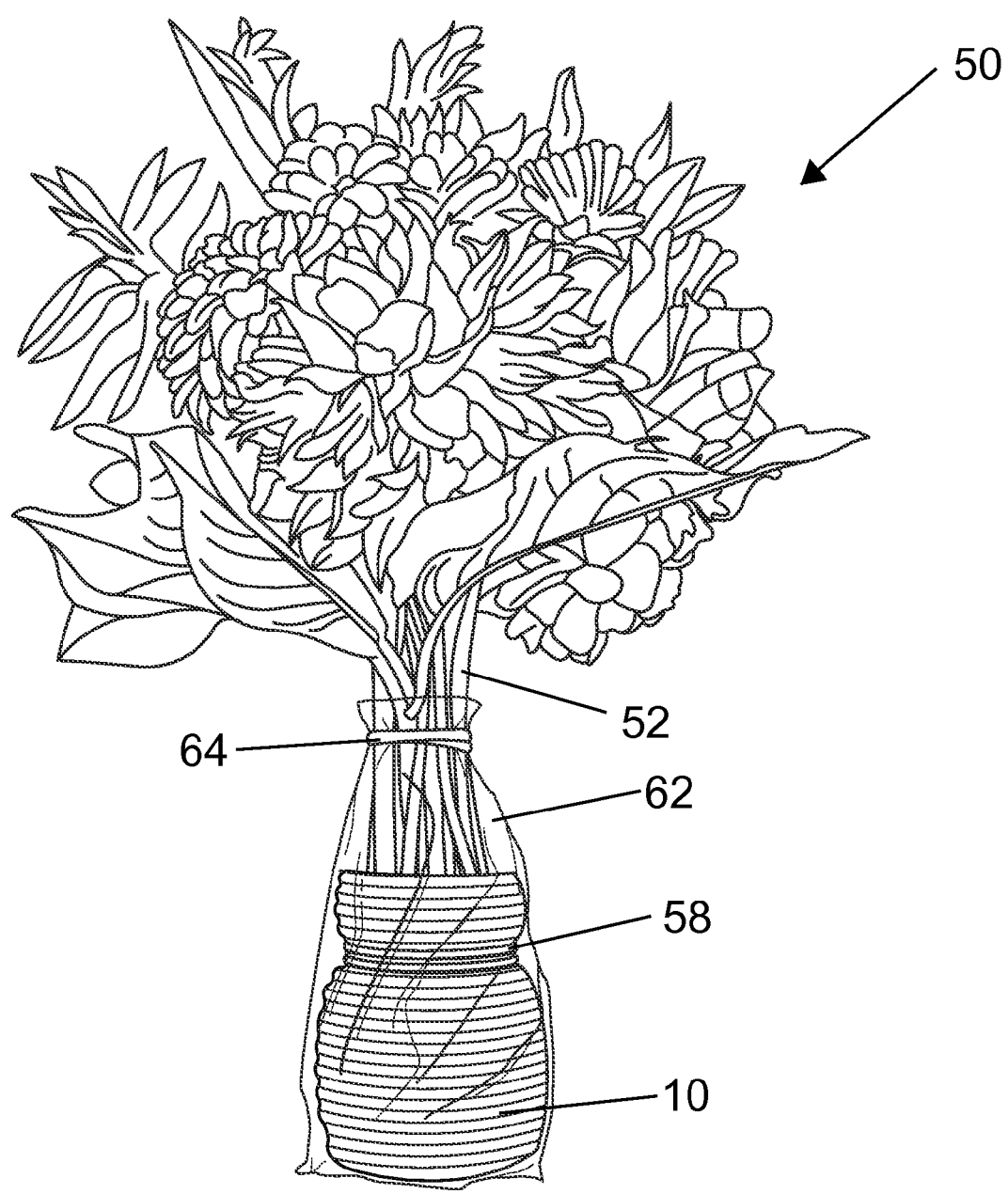
FIG. 7 is a perspective view of a bouquet of flowers with the stems substantially encompassed by the floral wrap of FIG. 1 and the bag releasably fastened to the bouquet to substantially seal the wrap and stems therein.

As depicted in FIGS. 6 and 7, after the wrap 10 is secured to the stems 52 of the bunch of flowers 50 and inserted into water, either before or after being secured to the stems 52, the bunch of flowers 50 is then placed in an enclosure 62 that is secured by a second fastener 64 near an open end of the enclosure 62. In an embodiment, the enclosure 62 can be a recyclable polypropylene bag. In an embodiment, the fastener 58 and the second fastener 64 can each be an elastic band, tape, glue, staples or any other fastener that is known or may become known to secure an enclosure to a floral arrangement.

Although the description above and accompanying drawings contains much specificity, the details provided should not be construed as limiting the scope of the embodiments, but merely illustrative as describing some of the features of the embodiments. The description and figures should not to be taken as restrictive and are understood as broad and general teachings in accordance with the present invention. While the embodiments have been described using specific terms, such description is for illustrative purposes only, and it is to be understood that modifications and variations to such embodiments, including, but not limited to, the substitutions of equivalent features and terminology may be readily apparent to those of skill in the art based upon this disclosure without departing from the spirit and scope of the invention.

What is claimed is:

1. An apparatus for hydrating flowers, comprising:
a liquid retaining wrap comprised of a single sheet of absorbent material configured to retain liquid that is delimited by a first sidewall having a first end and a second end, a second sidewall having a first end and a second end and extending substantially perpendicular from the second end of the first sidewall, a third sidewall having a first end and a second end and extending at a first angle from the second end of the second sidewall, a fourth sidewall having a first end and a second end and extending at a second angle from the second end of the third sidewall and a fifth sidewall having a first end and a second end and extending substantially at an angle from the second end of the fourth sidewall and substantially perpendicular to the first end of the first sidewall,
wherein the wrap includes a first portion having a substantially triangular shape extending between the second end of the second sidewall and the first end of the fifth sidewall toward an apex formed between the second end of the third sidewall and the first end of the fourth sidewall and a second portion having a substantially rectangular shape extending between the second end of the second sidewall and the first end of the fifth sidewall toward the first sidewall, and
wherein at least the first portion of the wrap is adaptable to directly contact a distal end of each one of a plurality of stems of the flowers.

2. The apparatus of claim 1, wherein the apex is substantially V-shaped such that the first portion substantially forms an isosceles triangle.

3. The apparatus of claim 1, wherein the wrap is flexible such that the first portion and the second portion of the wrap are foldable over the stems of the flowers.

4. The apparatus of claim 1, wherein the first angle formed between the second end of the second sidewall and the first end of the third sidewall and the second angle formed between the second end of the fourth sidewall and the first end of the fifth sidewall ensures that the element and the stems of the floral arrangement are in direct and continuous contact with each other.

5. The floral wrap of claim 1, further comprising an enclosure configured to encompass the wrap and releasably fasten the wrap therein.

6. The floral wrap of claim 5, wherein the enclosure is a polypropylene bag.

7. A method of assembling a floral hydration system, comprising the following steps:
providing a liquid retaining wrap comprising a single sheet of absorbent material configured to retain liquid that is delimited by a first sidewall that has a first end and a second end, a second sidewall that has a first end and a second end and extends substantially perpendicular from the second end of the first sidewall, a third sidewall that has a first end and a second end and extends substantially at a first angle from the second end of the second sidewall, a fourth sidewall that has a first end and a second end and extends at a second angle from the second end of the third sidewall and a fifth sidewall that has a first end and a second end and extends substantially at an angle from the second end of the fourth sidewall and substantially perpendicular to the first end of the first sidewall, wherein the wrap is divided into a first portion and a second portion, the first portion has a substantially triangular shape that extends between the second end of the second sidewall and the first end of the fifth sidewall toward an apex formed between the second end of the third sidewall and the first end of the fourth sidewall and the second portion has a substantially rectangular that extends between the second end of the second sidewall and the first end of the fifth sidewall toward the first sidewall, the second portion is divided into a first region that extends approximately from a midpoint of the first sidewall toward the second end of the first sidewall and from a midpoint between the first end of the fifth sidewall and the second end of the second sidewall, toward the second end of the second sidewall and a second region that extends approximately from the first end of the first sidewall to the midpoint of the first sidewall and from a midpoint between the first end of the fifth sidewall and the second end of the second sidewall, toward the toward the first end of the fifth sidewall;

placing a plurality of stems of flowers on the floral wrap;

folding the first portion of the wrap in a first direction toward the stems of the flowers to cover a distal end of the stems and directly contact each of the stems of the flowers placed thereon;

folding the first region of the second portion of the wrap in a second direction toward the stems of the flowers, at least partially covering the first portion of the floral wrap;

folding the second region of the second portion of the wrap in a third direction toward the stems of the flowers, which is opposite the second direction, and wrapping the second region of the second portion around the stems of the flowers, at least partially covering the first portion and the first region of the second portion to encompass the stems of the flowers with the floral wrap; and arranging a fastener over the floral wrap to releasably secure the floral wrap to the stems of the flowers.

8. The method of claim 7, further comprising the step of securing the stems of the flowers with another fastener prior to placing the stems onto the floral wrap.

9. The method of claim 7, further comprising the step of placing the floral wrap that is releasably secured to the stems of the flowers into water or a liquid solution to hydrate the flowers.

10. The method of claim 7, further comprising the step of placing the floral wrap into water or a liquid solution to hydrate the flowers prior to placing the plurality of the stems of the flowers thereon.

11. The method of claim 9, wherein the liquid solution is comprised of water and floral preservatives.

12. The method of claim 10, wherein the liquid solution is comprised of water and floral preservatives.

13. The method of claim 9, further comprising the step of squeezing the floral wrap to ensure the liquid solution does not drip therefrom.

14. The method of claim 10, further comprising the step of squeezing the floral wrap to ensure the liquid solution does not drip therefrom.

15. The method of claim 7, further comprising the steps of placing the floral wrap in an open end of a polypropylene bag and releasably securing the bag near the open end of the polymeric bag.

16. The method of claim 12, wherein the bag is releasably secured by an elastic band.

17. The floral wrap of claim 1, wherein the single sheet of absorbent material is devoid of openings.

* * * * *